United States Patent [19]

Turner

[11] 4,027,081
[45] May 31, 1977

[54] POLYMERIC COMPOSITIONS CONTAINING HYDROGEN BONDING COMPOUND

[76] Inventor: Stanley Turner, 849 N. Bruce, Apt. No. 1, Las Vegas, Nev. 89101

[22] Filed: Feb. 28, 1975

[21] Appl. No.: 554,010

Related U.S. Application Data

[63] Continuation-in-part of Ser. No. 275,903, July 28, 1972, Pat. No. 3,876,671, which is a continuation-in-part of Ser. No. 26,094, April 6, 1970, abandoned.

[52] U.S. Cl. .................................. 526/15; 526/1; 526/16; 526/242; 526/321; 526/328
[51] Int. Cl.² ................... C08F 8/14; C08F 214/06; C08F 214/20; C08F 218/14
[58] Field of Search ............... 260/78.4 D, 78.4 EP, 260/78.5 T, 836; 526/321, 16, 328, 1, 242, 15

[56] References Cited
UNITED STATES PATENTS

| | | | |
|---|---|---|---|
| 3,154,598 | 10/1964 | Vasta | 260/836 |
| 3,207,718 | 9/1965 | Zimmerman et al. | 260/836 |
| 3,215,756 | 11/1965 | Lombardi et al. | 260/836 |

Primary Examiner—John Kight, III
Attorney, Agent, or Firm—Joseph E. Kieninger

[57] ABSTRACT

Polymeric compositions containing a

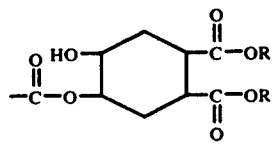

group are disclosed. An example of an improved vinyl chloride copolymer made in accordance with this invention has the following structural formula:

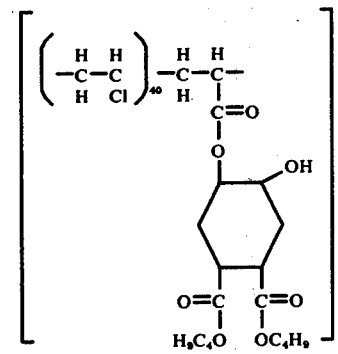

A mixture suitable for use as an improved adhesive containing a plasticizer and a terpolymer, for example, having the following structural formula:

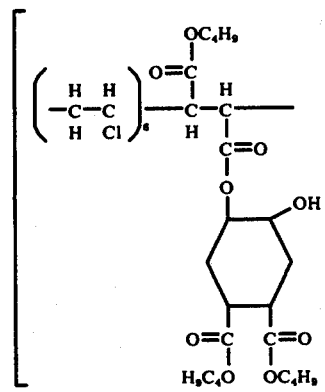

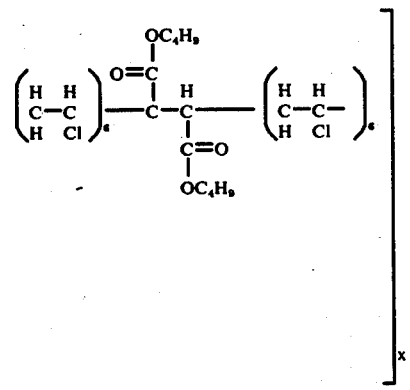

7 Claims, No Drawings

POLYMERIC COMPOSITIONS CONTAINING HYDROGEN BONDING COMPOUND

CROSS-REFERENCE TO OTHER PATENT APPLICATION

This is a continuation-in-part of applicant's co-pending patent application, Ser. No. 275,903, filed July 28, 1972, entitled "Compounds Derived From the Diesters of Epoxidized Tetrahydrophthalic Acid" which has issued as U.S. Pat. No. 3,876,671. Patent application, Ser. No. 275,903, is a continuation-in-part of applicant's patent application, Ser. No. 26,094, filed Apr. 6, 1970, entitled "Pressure Sensitive Adhesive" which has been abandoned.

This invention relates to compositions which have improved properties that are derived from the inclusion of a strong hydrogen bonding compound. Selectible ones of such properties include improved adhesion and cohesion properties for adhesives, improved functionality for general purpose plasticizers, and improved strength for plastic polymers. It is theorized that these improved properties are derived from the presence of a hydrogen bond derived from the hydroxyl radical on a cyclohexane ring, resulting from the reaction of a cyclohexyl epoxy compound with an organic acid or other liable hydrogen.

Because the hydrogen bonding feature is temperature-sensitive, it may be employed to cross link or vulcanize polymers at normal room temperatures, but above 130° F these forces weaken rapidly and these polymers may be molded as true thermoplastics. In adhesives this feature may be used to give adhesives which are true pressure sensitive below 130° F, but will become permanent adhesives if heated above 130° F.

As to the processing of the adhesive material, an intermediate terpolymer is produced which is readily handled as a free-flowing powder or granulation. The adhesive is formed from the reaction of this intermediate with an epoxy compound, the resulting adducted terpolymer remaining fluid and subject to easy handling on practical machinery for a suitable period of time.

The pressure-sensitive of this invention includes an adducted terpolymer based upon vinyl chloride and is produced by preparing an intermediate terpolymer that includes in its structure a diester and a monoester, of a dibasic unsaturated acid such as maleic and adducting an epoxy compound of the carboxyl radical of the monoester, and combining this adducted terpolymer with more of the said epoxy compound, the epoxy compound having the property of a plasticizer of said adducted terpolymer, as well as that of a reactant to form said adducted terpolymer.

For inclusion in a polymer chain, such as a comonomer, the epoxy compound will be reacted, such as by adduction, to an unsaturated organic acid. The unsaturated acid may be monobasic or diabasic, and one carboxyl radical of the dibasic acid can be reacted with an alcohol and the other reacted with the epoxy compound, or the comonomer may be difunctional, instead of monofunctional, by reacting two molecules of the epoxy compound with a dibasic acid, thereby doubling the number of hydrogen bonds.

The invention will be fully understood from the following detailed description, drawings appearing to be unnecessary to the disclosure of the same.

APPLICATION OF THIS INVENTION TO PRESSURE-SENSITIVE ADHESIVES

This invention as it applies to adhesives will be understood from the following detailed description of one useful adhesive, which is pressure-sensitive as to surfaces with which it has been in contact at temperatures below about 120° F, but will become a permanent adhesive if the temperature is raised above 130° F, and it will be disclosed by means of the method by which it is made, with reference to an exemplary formulation, together with suggested alternative components.

FORMATION OF THE INTERMEDIATE TERPOLYMER

The term "terpolymer" is used herein to connote a polymerized molecule which is derived from three or more difficult constituents. In every case, vinyl chloride will be one, and there will be two or more other different ones. For example, the intermediate terpolymer of this invention is derived from vinyl chloride, a diester of maleic acid and a monoester of maleic acid. There may, of course, be more constituents, and examples are later given of these. Therefore, the term "terpolymer" is not restricted to only three constituents, but means three or more. The presently preferred embodiment of this invention utilizes by weight approximately 60% of vinyl chloride, 32% diisobutylmaleate and 11% monoisobutylmaleate.

The term "monoester" is used herein to mean a mono-substituted acid ester of a dibasic acid, leaving, of course, one carboxyl radical for later adducting.

The alkyl radicals of these esters are preferably derived from commercial oxo alcohols which contain a mixture of straight and branched chain alcohols containing between 1 and 18 carbons. The presently preferred alcohol is isobutyl alcohol as the source of the alkyl radical.

The intermediate terpolymer is best prepared by the use of normal suspension polymerization techniques. These are customarily carried out in a glass-lined pressure reactor fitted with a turbine agitator, baffles, and charge ports. The following charge may readily be added to the formulation, being in parts by weight: 4500 de-ionized water; 2.0 medium molecular weight polyvinyl alcohol; 2.0 low molecular weight polyvinyl alcohol; 420 diisobutylmaleate; 172 monoisobutylmaleate; 900 (plus 90 excess) vinyl chloride; and 3.0 azodiisobutyronitrile. The de-ionized water and a stabilizing colloid are charged into the reactor. The catalyst is dissolved in the esters and charged into the reactor. The reactor is then purged of all oxygen, and the vinyl chloride is pumped in under pressure. The agitator is started, and the reactor is brought to the required temperature for the catalyst used. The combined reactants constitute 25% to 40% of the total charge. The reaction requires about 16–20 hours. The system pressure is observed, and when it drops to about 35–40 psi, the mass is transferred to a wash tank where the granular polymer is washed and stripped of unreacted vinyl chloride. The polymer is then filtered and dried and is in the condition of a fine granule. This is the intermediate terpolymer which is later to be reacted to form the adhesive.

There are many colloids which have been used for suspension polymerization. It has been found that the polyvinyl alcohols partially hydrolized grades in low and medium viscosity ranges are good stabilizers. Poly-acrylic acid will also function well, as will the interpolymer of vinyl methyl ether and maleic anhydride low molecular weight type.

The catalysts used are the typical free radical types used in most vinyl polymerizations. Lauryl peroxide and azodiisobutyronitrile have been found to be effective in the range of between 0.05% to 0.2%.

PREPARATION OF THE EPOXY COMPOUND

The preferred epoxy compound is made by oxidizing the remaining double bond of a suitable diester, of tetrahydrophthalic anhydride, yielding a 3–4 epoxide. The alkyl chain is from 1–18 carbons, straight or branched, as before, preferably being made from 3–10 carbon commercial oxo alcohols having a mixture of normal and branched isomer. An important requirement of the epoxy compound is that it must be a primary plasticizer for the terpolymer when made into a branch terpolymer with the same epoxy compound adducted to it.

PREPARATION OF THE ESTERS

The diester monomer may have alkyl groups from 1–18 carbon, straight or branched, with the preferred range lying between —3–10 carbon, mixed isomers. Examples of suitable acids are maleic, fumaric, or itaconic. Mixed alkyl groups of the same acid may be used, and some of these possess the best average of properties for most adhesive uses. For example, 1 mol equivalent of maleic anhydride and 1 mol equivalent of isononyl alcohol may be charged into an esterification apparatus which is fitted for inert gas cover. This is heated with agitation. At approximately 80° C, heating is discontinued, and the exothermic reaction will bring the temperature up to about 130°–140° C. When the temperature begins to subside, heating is resumed and n-propyl alcohol is added at a rate sufficient to give a mild reflux and remove the water of reaction.

The esterification may be carried to completion, or it may instead be stopped at a point that supplies the necessary amount of monoester for the particular adhesive formula. The products of this reaction will contain some dipropylmaleate and some diisononylmaleate. The monoester present will be predominantly isononyl.

The monoesters may be prepared from maleic, or itaconic acids. Acrylic or methacrylic may also be used to supply the carboxyl groups to the terpolymer. Of these, the maleates are by far the most useful. The monoitaconates and the acrylic acids polymerize well in forming the terpolymer.

A suitable intermediate terpolymer may have the following weight percentages of its various formatives: 40–70% vinyl chloride, 5–55% diester, and 3–40% monoester. The presently preferred embodiment is approximately 60% vinyl chloride, 29% diester and 11% monoester.

In the adducting process, it has been found that the intermediate terpolymer may conveniently be combined with the epoxy compound to form the ultimately desired adhesive in a range between approximately 30–60% intermediate terpolymer and 40–70% epoxy compound. It has been determined that only a small portion of the epoxy compound reacts with a portion of the monoester in the terpolymer chain, thereby resulting in unreacted epoxy which serves as a plasticizer. There is also unreacted monoester in the chain.

The intermediate terpolymer may vary in intrinsic viscosity from 0.6 to 2.4. The relatively large span in molecular weight indicated by this range of useful viscosities provides for selectivity of properties in formulating specific adhesives. Intermediate terpolymers of different molecular weights may be blended prior to the adducting reaction. Molecular weight is usually controlled by the reactants used and the conditions of the reaction. However, "chain stoppers," such as the chlorinated hydrocarbons, may be used for this purpose as well. As in all ethylenic polymerizations, high temperatures and large amounts of catalysts lead to low molecular weights. In these intermediate terpolymers, there is an additional control in that large amounts of low molecular weight di- and monoesters will lower the molecular weight of the intermediate terpolymer. As applied to the completely reacted adhesive, it may be generally stated that, when the intermediate terpolymer contains relatively large amounts of low molecular weight diesters, the adhesive will have the greatest adhesion, least cohesion and be most temperature-sensitive. On the other extreme, large amounts of vinyl chloride with large alkyl, di- and monoesters yield adhesives with least adhesion, greatest cohesion, and are relatively temperature-insensitive. Properties of the adhesive can also be controlled by varying the ratio of di- to monoester. As the carboxyl content of the terpolymer increases, the tack of the adhesive will lower and cohesion will increase.

It is important to control the degree of homogeneous to heterogenous polymers formed. The monomer reactivity rate of vinyl chloride polymerizing with itself is much greater than that of vinyl chloride copolymerizing with the di- and monoesters. If all reactants are charged into the reactor at the start, the first polymer formed will contain more vinyl chloride, and be of higher molecular weight, then the final polymer formed. This is an advantage in many adhesive formulas, and greater heterogeneity can be developed by withholding part of the esters at the start and adding them gradually during the reaction. Conversely, the polymer may be made more homogeneous by withholding part of the vinyl chloride and adding it gradually during the reaction.

ADDUCTING OPERATION

The adducting and coating operations are carried out substantially simultaneously. A blend of the intermediate terpolymer and the liquid epoxy compound into which there has been dispersed approximately 1% of a vinyl chloride stabilizing compound, such as the commonly known barium-cadmium complex, is fed from a blender into an extrusion machine which has been modified with a vacuum seal on the screw at the feed section to remove air from the charge. Also, the screw is run at a higher than normal speed so as to shear the material and develop frictional heat within its contents. This will first plasticize the slurry to a viscous plastic mass, and then, at the higher temperature, it will react the carboxyl and epoxy groups. As the mass nears completion of this reaction, it is necessary to shape it rather quickly to a film for coating on a substrate, because the mass will soon reach an unworkable viscosity.

The reacted material is fed from the die onto some substrate where it sets to a film useful as a pressure-sensitive adhesive.

The generalized equations for the reactions herein are summarized by the following example:

For the preparation of the intermediate terpolymer:
a. Vinyl Chloride b. A suitable diester (for example, the diester of maleic acid) wherein the radical R is isobutyl.

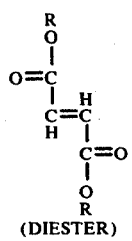
(DIESTER) (a)

c. A suitable monoester (acid ester), (for example, the monoester of maleic acid) wherein the radical R is as in example "a" above:

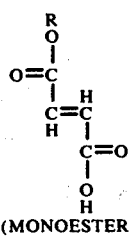
(MONOESTER) (b)

The prepared intermediate terpolymer has the following general structure when the following mol ratios are used: 20 vinyl chloride, 2 diester, 1 monoester:

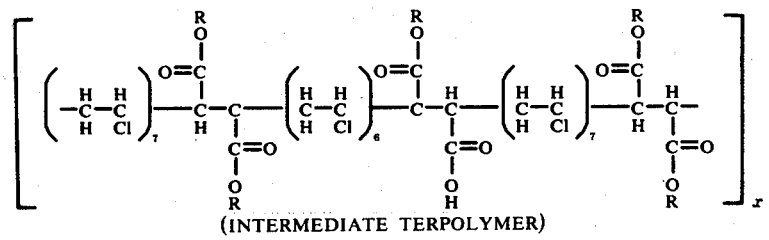
(INTERMEDIATE TERPOLYMER) (c)

The adducting step utilizes an epoxy of which the following is an example:

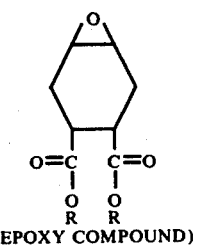
(EPOXY COMPOUND) (d)

The adducted monoester component after adduction into formula (c) is as follows:

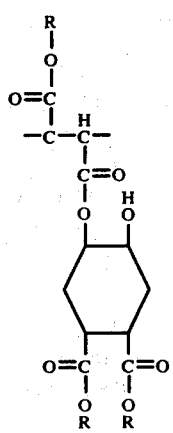
(e)

-continued
(ADDUCTED MONOESTER COMPONENT)

The radical $R_1$ is from 1 to 18 carbon, straight or branched, preferably made from 4 to 10 carbon commercial oxo alcohols having a mixture of normal and branched isomers.

The vinyl chloride component in formula (c) is, of course:

(VINYL CHLORIDE COMPONENT) (f)

The lack of cold-flow in the pressure-sensitive adhesive of the above example appears to be due to the hydrogen bonding affect of the hydroxyl-bearing molecule produced when the epoxy compound is adducted to the carboxyl group of the polymeric chain. While all hydroxyl compounds have this hydrogen bonding effect, this particular molecule, with the hydroxyl on the cyclohexane ring, possesses unusual bonding strength. It is believed the bond is to a chlorine atom in an adjacent polymer chain, as this bond would explain the affects produced in this adhesive molecule.

It has been found more practical to adduct the epoxy compound to the ethylenic acid before said acid is copolymerized with vinyl chloride and other modifying monomers. The acids used were maleic, fumaric, itaconic, acrylic and methacrylic. The dibasic acids may be used as such to form diesters with the epoxy compound, or they may be used as the monoester of alkyl groups having 1 to 18 carbon or they may be used as the half ester with the epoxy adducted to one carboxyl only. The most common range for average pressure-sensitive adhesives is one mole bonding hydrogen monomer per 100 to 200 moles of other monomers. For special purpose adhesives, a range of 10 to 500 moles of other monomers per one mole hydrogen bonding monomer has been used. As one increases the hydrogen bonding group concentration, tack is reduced, and cohesion is increased until the adhesives are no longer pressure-sensitive, but are strong, heat-bonding, permanent adhesives.

A typical terpolymer with the hydrogen bonding molecule copolymerized in would be 65% vinyl chloride, 30% diester and 5% of the hydrogen bonding monomer.

Suspension polymerization method is used. A typical laboratory polymerization is as follows: to a 3 liter reactor is added 1400 gms deionized water, 1 gm polyvinyl alcohol (Elvanol R 51-05), 1 gm polyvinyl alcohol (Elvanol R 50-42). The suspending agents are dissolved in the water and the reactor purged of air with vacuum and nitrogen. Then the following were added: 1 gm azobisisobutyronitrile, 180 gms dibutylmaleate, 30 gms hydrogen bonding monomer and 400 gms vinyl chloride. The catalyst is dissolved in the dibutylmaleate and added to the reactor. Vinyl chloride is then pumped in and the reaction brought to 55° C under agitation. After about 30 minutes at 55° C the hydrogen bonding monomer is metered in over a period of 3-6 hours. Hydrogen bonding adduct of acrylic and itaconic acids homopolymerize, and are best metered in slowly over the period of the reaction. They also materially increase the polymerization rates of the total system. The adducts of maleic and fumaric acids are best added to the reactor in total at the start.

When the system pressure reduces to 30-35 PSIG the reactor is cooled to 20° C the unreacted vinyl chloride, approximately 5% is stripped off and the polymer washed and dried.

The fine granular polymer is converted to an adhesive by mixing with a plasticizer. Commercial plasticizers for polyvinyl chloride such as disoctylphthalate may be used, but best results are obtained with a hydrogen bonding plasticizer of the type disclosed in Ser. No. 275,903. 40-60% polymer is mixed with 60-40% plasticizer. The polymer and plasticizer must be fused and this is best done in an extrusion machine. To the slurrie of granular polymer in plasticizer is added a heat stabilizing compound, approximately 1% of a barium-cadmium complex or other commercial heat stabilizer is added. The mixture is run through a standard plastic extrusion machine with a vinyl screw, and coated on release paper from a sheet die. The adhesive can now be transferred to any substrate. Below 130° F, this adhesive will remain permanently pressure-sensitive and will remove cleanly from any surface. Above 130° F, this adhesive begins to bond to any non-releasing surfaces it is in contact with. It is believed this action is a result of the weakening of the hydrogen bonding forces that keep the adhesive mass from flowing. As the mass is allowed to flow, it wets the surfaces and orients its molecules to a position of much greater adhesion. The adhesion increases 5 to 10 times over the pressure-sensitive levels and failure occurs within the adhesive film as a cohesion failure, rather than stripping the film from the surfaces.

The properties of these adhesives can be highly varied to suit various end uses. The ratios of vinyl chloride to diester to hydrogen bonding molecule can be varied. The length of the alkyl groups can be varied. Monoester of the dibasic acids can be substituted for all or part of the diester. The molecular weight of the polymer can be controlled.

The adhesives will have the greatest adhesion when the most di or mono butyl maleate are used and the polymer is of low molecular weight. They will have the most cohesion when the most vinyl chloride is used, least plasticizer and highest molecular weight. Increasing the amount of hydrogen bonding monomer will increase the temperature necessary to reach maximum adhesion, but it will still start to become a permanent bond at 130° F.

The range of monomers in the terpolymer is approximately 50-90% vinyl chloride, 10-45% di and/or monoesters of maleic acid, 2-15% hydrogen bonding monomer.

The range of polymer to plasticizer is 50-85% polymer, 15-50% plasticizer.

The monomers that add the hydrogen bonding characteristic to the polymer chain are formed by adducting the epoxy molecule to an unsaturated acid. The preferred epoxy compound is made by oxidizing the remaining double bond of a diester of tetrahydrophthalic acid yielding a 3-4 epoxide. The alkyl chain may be from 1 to 18 carbon, straight or branched, but is usually 4-10 carbon. This epoxide is then adducted to an unsaturated acid such as maleic, fumaric, itaconic, acrylic or methacrylic. The difunctional acids may adduct two epoxy groups or they may have one epoxy group and one carboxyl group or they may be mixed ethers of one epoxy group and one alkyl group. If mixed esters are wanted, they are best made from itaconic acid or maleic anhydride, which will preferentially esterify one alkyl group as the first order reaction, then the remaining carboxyl adducted to the epoxy. When a mixed epoxy and carboxyl molecule is desired itaconic is the most likely acid as it will selectively adduct one epoxy group as the first reaction. This adduction reaction proceeds smoothly at 150°-180° C, with maleic, fumaric and itaconic acids, stoichiometric quantities are used. When the acid is acrylic or methacrylic, the compound polymerizes so readily that it is necessary to use an esterification catalyst to reduce the reaction temperature, and free radical acceptors to suppress polymerization. Lewis acid type catalysts that do not promote polymerization of the double bond are suitable catalyst, i.e. nitrophenol sulfonic acid.

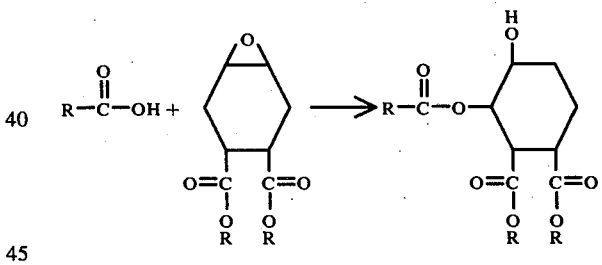

Example 1: 130 parts itaconic acid are mixed with 298 parts epoxy compound of $C_4$ alkyl groups; the mixture is heated under nitrogen and with agitation to 150° C for 6 hours. The acid number of the mixture is reduced to one-half and there are substantially no unreacted epoxy groups present.

Example 2: 74 parts butyl alcohol are added to 98 parts maleic anhydride and heated under nitrogen to approximately 90° C, heating is discontinued and the exothermic reaction will raise the temperature to approximately 140° C. As the temperature begins to subside, heating is resumed to 180° C and the reaction product allowed to cool. At approximately 100° C, a hydrocarbon such as dry toluene is added dropwise and the trace of water of reaction distilled over. The residual solvent and any unreacted alcohol is then distilled over at 28"Hg of vacuum and with a dry nitrogen gas sparge. To this reaction product is added 298 parts of $C_4$ diester epoxy compound, and the mixture heated under nitrogen to 180° C with 1 agitation for 3 hours. The reaction product has an acid number near zero and there are no unreacted epoxy groups present.

APPLICATION OF THIS INVENTION TO PERMANENT ADHESIVES

The foregoing example can produce adhesives which, if heated above a given temperature (usually about 130° F) while in contact with a surface, will apparently flow into such intimate contact with the surface heated that even after cooling to a temperature below that given temperature, it is permanently adherent thereto. The hydrogen bonding will be increased in accordance with the above considerations if a more permanent bond is desired. By this is meant an increase in the molecular content of the adducted terpolymer of reacted epoxy molecules which leave a hydroxyl radical free for bonding with other molecules. This is the meaning of the term "hydrogen bonding" as used herein.

In compounding for permanent bonds, the amount of hydrogen bonding molecule in the poly molecule may be increased to 50% or more. As one increases the amount of the hydrogen bonding molecule, one does not increase the temperature at which the bond starts to become permanent, but does increase the temperature required to be reached to achieve maximum bond strength, and the service temperature of the bond is increased. As bonded joints of this type tend to fail in the polymer film, rather than at the interface with the substrate, increasing the cohesive forces increases the strength of the bond. The hydrogen bonding molecule also appears to increase the bond strength at the interface.

Accordingly, increasing the proportion of the reacted epoxy molecule in the adhesive will tend to provide an adhesive which will make an increasingly permanent bond with a surface to which it is contiguous.

APPLICATION OF THIS INVENTION TO POLYMERS

When an acid with ethylenic unsaturation is adducted to an epoxy compound, as follows:

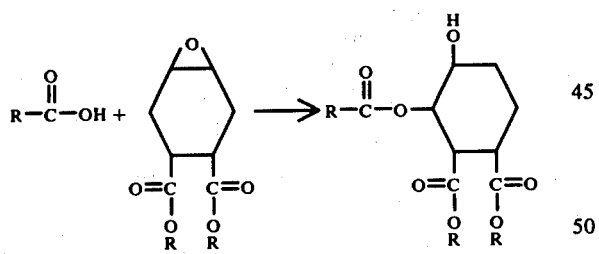

and said adducted molecule is copolymerized with vinyl chloride or vinyl floride the hydroxyl of the adducted molecule shows great hydrogen bonding strength when said hydroxyl is on a cyclohexane ring.

This hydrogen bonding effect forms a "pseudo-cross-linked" or vulcanized affect which can be used to improve the quality of a variety of flexible and rigid plastic products.

The polymer products made have the general formula

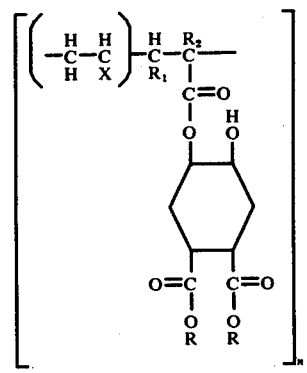

where
$x$ is Cl or F
$a$ is 1 to 400
R is an alkyl group having 1 to 18 carbon atoms
$R_1$ is H, COOH, COOR, and

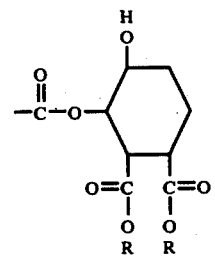

$R_2$ is H, $CH_3$, $CH_2COOH$, $CH_2COOR$, and

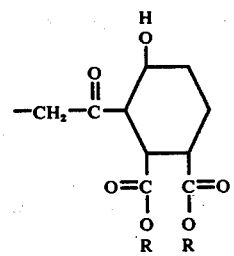

The following table illustrates the groups for $R_1$, and $R_2$ for various ethylenic unsaturated acids:

| $R_2$ | $R_1$ | Acid |
|---|---|---|
| H | H | Acrylic |
| $CH_3$ | H | Methacrylic |
| H | $\overset{O}{\underset{\|}{C}}$—OR | Maleic mono alkyl ester |
| H | $\overset{O}{\underset{\|}{-C}}$—OH | Maleic mono carboxyl |

-continued

| $R_2$ | $R_1$ | Acid |
|---|---|---|
| H | ![structure with H, O, C=O-O-ring with O=C C=O, OR OR] | Fumaric, diadduct |
| ![-C(H)(H)-C(=O)-OR structure] | H | Itaconic mono alkyl ester |
| ![-C(H)(H)-C(=O)-O-ring structure with O=C C=O, OR OR] | H | Itaconic, diadduct |
| ![-C(H)(H)-C(=O)-OH structure] | H | Itaconic, mono carboxyl |

In preparing this comonomer, the adducting proceeds smoothly at 160°–180° C, and stoichiometeric amounts are used. When maleic, fumaric or itaconic acid is used, one may adduct an epoxy compound to both carboxyls, or the acid may be used as a half ester of an alkyl group. When the acid is acrylic or methacrylic, the compound polymerizes so readily that it is necessary to use an esterification catalyst to reduce the reaction temperature, and free radical acceptors to suppress polymerization. Lewis acid type catalysts that do not promote polymerization of the double bond are suitable catalysts, i.e. nitrophenol sulfonic acid. All of the adducting reactions are run in an oxygen-free atmosphere and with sufficient agitation for adequate heat transfer.

The "ring" epoxy compounds used in these preparations are the diesters of tetrahydrophthalic acid with the remaining double bond oxidized to a 3–4 epoxide. The alkyl chain can be from 1 to 18 carbon, depending on the intended end use, but is usally 2–6 carbon.

EXAMPLE 1

1.5 parts of nitrophenol sulfonic acid are dissolved in 72 parts acrylic acid and added to 298 parts of an epoxy compound, which is the reaction porduct of oxidizing dibutyl tetrahydrophthalic acid to the 3–4 epoxide. The mixture is heated with agitation to 80° C and the heat source removed as the exothermic reaction increases the temperature to approximately 110° C. As the reaction temperature begins to drop, heating is resumed and the reaction held at 100°–110° C for 30 minutes. It is then cooled to approximately 20° C and washed twice with a 5% solution of sodium carbonate to remove the catalyst, and then three times with deionized water to remove any residual sodium carbonate. The adduct is then separated from the aqueous phase. This monomer may be used as is, in suspension or emulsion polymerization, but if not used soon after preparation, it should be dried under reduced pressure and inhibited as it polymerizes readily.

EXAMPLE 2

74 part butyl alcohol are added to 98 parts maleic anhydride and heated under nitrogen to approximately 90° C. Heating is discontinued and the exothermic reaction will raise the temperature to approximately 140° C. When the temperature begins to fall heating is resumed and continued until the reaction reaches 180° C. The reaction product is cooled to approximately 100° C and 5–10 parts of a hydrocarbon such as toluene added. It is then distilled over as an azeotropic mixture with the trace of water of reaction. 28"Hg of vacuum and a dry nitrogen gas sparge is used. To the dry reaction product is then added 298 parts of the epoxy compound of Example 1, and the mixture heated under nitrogen and agitation to 180° C for 1 hour and then cooled to ambient.

EXAMPLE 3

130 parts itaconic acid are mixed with 298 parts of the epoxy compound of Example 1 and the mixture heated under nitrogen and with agitation to 150° C for 6 hours and then cooled. This reaction product is principally the mono epoxy adduct with one carboxyl group of the acid unreacted and is used where it is desirable to incorporate carboxyl groups into a polymer.

EXAMPLE 4

116 parts fumaric acid are mixed with 820 parts of an epoxy compound which is the epoxidized diisooctyl ester of tetrahydrophthalic acid. The mixture is heated under nitrogen and with agitation at 190°–195° C for 4 hours. This monomer is most useful to incorporate a large number of hydrogen bonding groups into a low molecular weight vinyl copolymer for non-plasticized rigid plastic products.

These comonomers can be copolymerized with vinyl chloride by simply adding them to the reactor. The amounts used depend on the intended end use of the copolymer. For flexible products, ½ to 5% based on the vinyl chloride content is the normal range. For rigid products, 50% or more may be used.

Adducts of maleic and fumaric acid tend to lower the molecular weight of the final product if used in amounts by weight in excess of about 10%. Adducts of acrylic and methacrylic acid polymerize so rapidly they are best added to the reaction slowly over the total reaction time. They tend to increase the rate of the reaction, reducing the time required to complete polymerization.

For rigid applications, such as pipe, 5 to 10% of the di- epoxy adduct of itaconic acid can be used. This copolymer is easier to heat stabilize (for processing) than 100% vinyl chloride. Higher molecular weight products can be fabricated with corresponding increases in tensile and impact strengths. The hydrogen bonding effect begins to diminish at 130° F, and at normal extrusion or molding temperature is nil and does not interfere with processing speed. In vinyl products with normal service temperatures below 130° F, the hydrogen bonding effect will increase strength and rigidity in rigid products. In flexible products, it will increase toughness and reduce plasticizer migration.

The total percentage of bondable hydrogen to vinyl chloride is the prime factor on its modifying effect on the polymer, but there is some evidence that mono hydrogen bonding adducts are better in flexible products and di hydrogen bonding in rigid products.

A typical suspension polymerization in a 3 liter laboratory reactor is as follows:
1400 gms de-ionized water
1 gm polyvinyl alcohol (Elvanol R 51–05)
1 gm polyvinyl alcohol (Elvanol R 50–42)
0.9 azobisisobutyronitrile in 20 ml methyl alcohol
600 gms vinyl chloride
12 gms acrylic acid, epoxy cylohexane 8 carbon alkyl diester adduct The polyvinyl alcohol was first dissolved in the water, and the reactor purged of air with nitrogen. The catalyst was added as a solution in methyl alcohol and 600 gms vinyl chloride pumped in. The reaction was brought to 55° C under agitation. At 55° C, very small increments of the adduct were pumped in requiring 3 hours to add the 12 gms. After 4½ hours, reactor pressure was 35 psig, indicating approximate 95% conversion to polymer. The reactor is cooled to 20° C and the unreacted vinyl cloride stripped from the polymer. It is then washed and dried. This high molecular weight polymer is for plasticized flexible products.

A lower molecular weight polymer intended for rigid products may be polymerized as follows:
1400 gms de-ionized water
1 gm polyvinyl alcohol (Elvanol R 51–05)
1 gm polyvinyl alcohol (Elvanol R 50–42)
2.7 gm azobisisobutyronitrile in 20 ml methyl alcohol
580 gms vinyl chloride
60 gms itaconic acid, di adduct of epoxy cyclohexane 4 carbon alkyl diester The suspending agent is first dissolved in the water and the reactor purged of air with vacuum and nitrogen. The catalyst solution added and the vinyl chloride pumped in. The reaction was brought to 60° C under agitation. At 60° C the adduct metering pump is started and the adduct added over a 2 hour period. After approximately 3 hours at 60° C, the reactor pressure will drop to 35 psig. The reaction is cooled to 20° C and stripped of the residual monomeric vinyl chloride, usually about 5% of the initial charge. The fine granular polymer is washed and dried. The polymer may be mixed with commercial heat stabilizers and extruded or injection molded.

Vinyl floride may be substituted for the vinyl chloride. Vinyl floride is noted for its exceptional weathering qualities and its resistance to many chemicals and solvents. Copolymerizing 2–5% of a hydrogen bonding monomer with vinyl floride will enhance these qualities, plus improve its toughness and add a degree of resilience. Stressed sections will not cold flow.

A typical laboratory polymerization is as follows:
A high pressure 1 liter stainless steel autoclave, fitted with internal vanes and supported so it can be rapidly oscillated within a heating bath, is evacuated and refilled with nitrogen. It is then charged with
330 gms deionized water
0.170 gms azobisisobutryonitrile dissolved in
8 gms of the acrylic acid adduct of epoxy cyclohexane 8 carbon alkyl diester
0.5 gms suspending agent, perfluorinated 8 carbon carboxylic acid. (L1159) 3M Corporation
170 gms of vinyl floride are then pumped in and the system pressure is increased to approximately 1000 psi from a nitrogen cylinder. Heat is started on the heating bath and agitation started. The bath temperature is raised to 70° C. in 1 hour and maintained there for an additional 19 hours.

The reactor is then cooled and the nitrogen and mono vinyl floride very slowly bled off.

The washed and dried polymer is 163 gms and equal approximately 92% coversion. Films can be cast from this polymer from hot solvents such as methylformamide. The temperature required to weaken the hydrogen bond in the floride polymer seems to be about 180° F. This copolymer can be plasticized if desired with a hydrogen bonding type plasticizer. The butyric acid adduct of the epoxidized dibutyl ester of tetrahydrophthalic acid is very compatible with this copolmer and may be used at 5–10% to help fuse the resin for film casting.

MOLDABLE ELASTOMERS

A rubber like composition that can be molded in injection molding equipment at near thermoplastic molding speeds can be made with the hydrogen bonding plasticizers and the hydrogen bonding monomers. These compositions are highly plasticized, high molecular weight polyvinyl chloride that has 0.5 to 1 mole percent of a hydrogen bonding monomer copolymerized in. The hydrogen bonding monomers that seem best suited to this application are the acrylic acid adducts and the itaconic mono ester adducts.

A typical laboratory polymerization is as follows:
1400 gms de-ionized water
1 gm polyvinyl alcohol (Elvanol R 51–05)
1 gm polyvinyl alcohol (Elvanol R 50–42)
1 gm azobisisobutyronitrile
660 gms vinyl chloride
70 gms isooctyl monoester itaconic acid adduct of epoxycyclohexane 8 carbon alkyl diester Using the same polymerization procedures used in the section on polymers, the reaction temperature is 55° C. The itaconic acid adduct is pumped in over a 6 hour period and polymerization is about 95% complete in about 8 hours.

The dried polymer is mixed with a hydrogen bonding plasticizer and a heat stabilizer. The amount of plasticizer used is dependent on the shore hardness wanted and is usually in the 30–60% range. Both mono hydrogen and poly hydrogen plasticizers having the larger alkyl chains 10–18 carbon. About 2% of the plasticizer is usually of the 4–6 carbon alkyl, when the more efficient short chain plasticizers are extended with long chain plasticizers the best average of properties are obtained. These rubber like products do not cold flow and have little or no compression set below 120° F. A typical formula is:

- 100 part polymer
- 50 part mono hydrogen plasticizers with C 6 alkyl chains
- 50 parts di hydrogen plasticizer, the adduct of 2 moles of epoxy cyclohexanes with C 8 ester chains and the C 36 dimer acid
- 2 parts heat stabilizer When molded this formula gives a very flexible product of shore hardness 50–55T. 400% elongation and 1200 psi tensile.

With all these varibles an infinite number of formulae are possible. The essential factors are the vulcanizing effect of the hydrogen bonding molecule copolymerized into the polymer and the hydrogen bonding plasticizers which allow a large amount of plasticizer to be used without migration.

I claim:

1. A polymer having the general formula

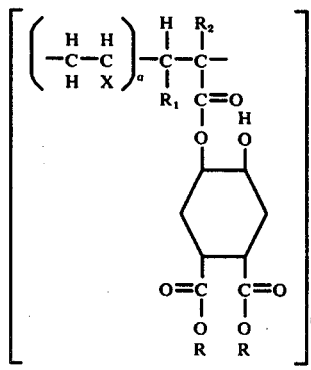

where $x$ is Cl or F $n$ is a value to provide an intrinsic viscosity of 0.6 to 2.4

$a$ is 1 to 400

R is an alkyl group having 1 to 18 carbon atoms $R_1$ is H, COOH, COOR, and

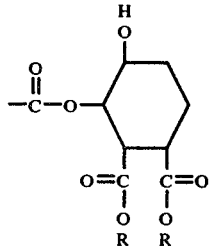

$R_2$ is H, $CH_3$, $CH_2$ COOR, $CH_2COOH$, and

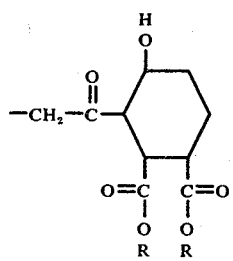

2. A polymer as described in claim 1 wherein $R_1$ is H.

3. A polymer as described in claim 1 wherein $R_2$ is H.

4. A polymer as described in claim 1 wherein $R_1$ and $R_2$ are H.

5. A polymer as described in claim 1 wherein $x$ is Cl.

6. A polymer as described in claim 1 wherein X is F.

7. A mixture suitable for use as an adhesive comprising (a) 15 to 50% plasticizer and 50 to 85% of a polymer having the general formula

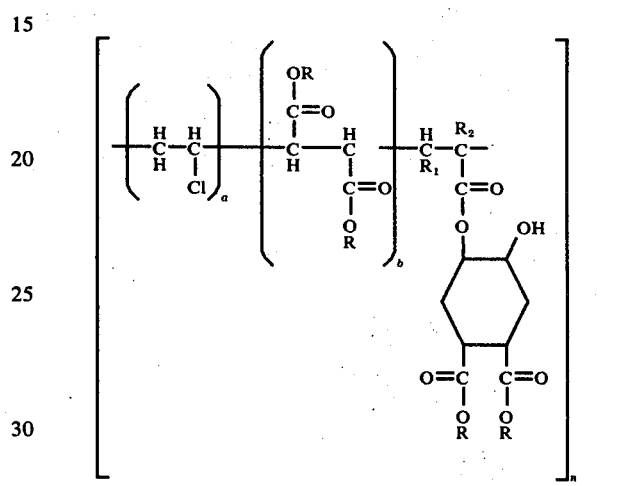

$n$ is a value to provide an intrinsic viscosity of 0.6 to 2.4

$a$ is 5 to 50

$b$ is 5 to 50

$R$ is an alkyl group having 1 to 18 carbon atoms $R_1$ is H, COOH, COOR, and

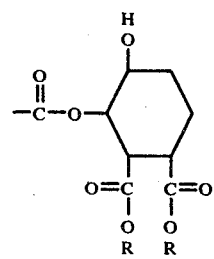

$R_2$ is H, $CH_3$, $CH_2COOR$, $CH_2COOH$, and

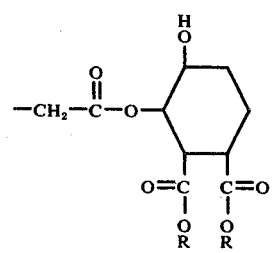

* * * * *